United States Patent [19]

Zabron et al.

[11] Patent Number: 5,495,935

[45] Date of Patent: Mar. 5, 1996

[54] CONVEYOR BELTING AND METHOD OF MANUFACTURE

[75] Inventors: Florian S. Zabron, Orchard Park; David K. Rice, Alden, both of N.Y.; Ernest E. Atkins, Phoenix, Ariz.

[73] Assignee: Globe International Inc., Buffalo, N.Y.

[21] Appl. No.: 289,767

[22] Filed: Aug. 12, 1994

[51] Int. Cl.$^6$ ................................................ B65G 15/34
[52] U.S. Cl. ............................................................ 198/847
[58] Field of Search ................................ 198/844.2, 846, 198/847

[56] References Cited

U.S. PATENT DOCUMENTS

| | | | |
|---|---|---|---|
| 2,575,813 | 11/1951 | Hutchins | 198/847 X |
| 3,190,137 | 6/1965 | Adams, Jr. | 74/233 |
| 3,197,021 | 7/1965 | Williams | 198/847 X |
| 4,094,402 | 6/1978 | Heeke | 198/847 |
| 4,154,335 | 5/1979 | Burnett et al. | 198/847 |
| 4,157,752 | 6/1979 | Sick et al | 198/84 |
| 4,209,089 | 6/1980 | Day | 198/847 |
| 4,369,081 | 1/1983 | Curry et al. | 156/148 |
| 4,407,333 | 10/1983 | Fowkes | 198/846 X |
| 4,444,305 | 4/1984 | Parker et al. | 198/844 |
| 4,526,637 | 7/1985 | Long | 198/847 X |
| 4,744,843 | 5/1988 | Lewis | 156/87 |
| 4,787,516 | 11/1988 | Morrison | 206/566 |
| 4,813,533 | 3/1989 | Long | 198/847 |
| 4,900,609 | 2/1990 | Arnold | 198/847 X |
| 4,928,812 | 5/1990 | Van Calker et al. | 198/847 |
| 5,069,907 | 12/1991 | Mixon et al. | 424/445 |
| 5,238,749 | 8/1993 | Cueman et al. | 428/441 |

FOREIGN PATENT DOCUMENTS

| | | | |
|---|---|---|---|
| 2412001 | 9/1975 | Germany | 198/847 |
| 3229813 | 2/1984 | Germany | 198/847 |
| 0072717 | 4/1985 | Japan | 198/847 |
| 5178434 | 7/1993 | Japan | 198/847 |
| 0542686 | 2/1977 | U.S.S.R. | 198/847 |

*Primary Examiner*—James R. Bidwell
*Attorney, Agent, or Firm*—Hodgson, Russ, Andrews, Woods & Goodyear

[57] ABSTRACT

A double-scrim belting (10) is described having a first woven scrim (12) and a spaced apart and substantially parallel second woven scrim (14) connected by staple fibers (18) consolidated together through entanglement and integrated with the scrims through entanglement, both entanglements being of the kind typically produced by needling. If desired, a non-woven web of staple fibers is needled to the outer surfaces of the scrims and the thusly formed belting is completely encapsulated in a matrix of elastomeric material 36. If the belting is intended to be used to convey food grade products, preferably an antibacterial agent is incorporated into the elastomeric material to inhibit bacterial growth.

59 Claims, 5 Drawing Sheets

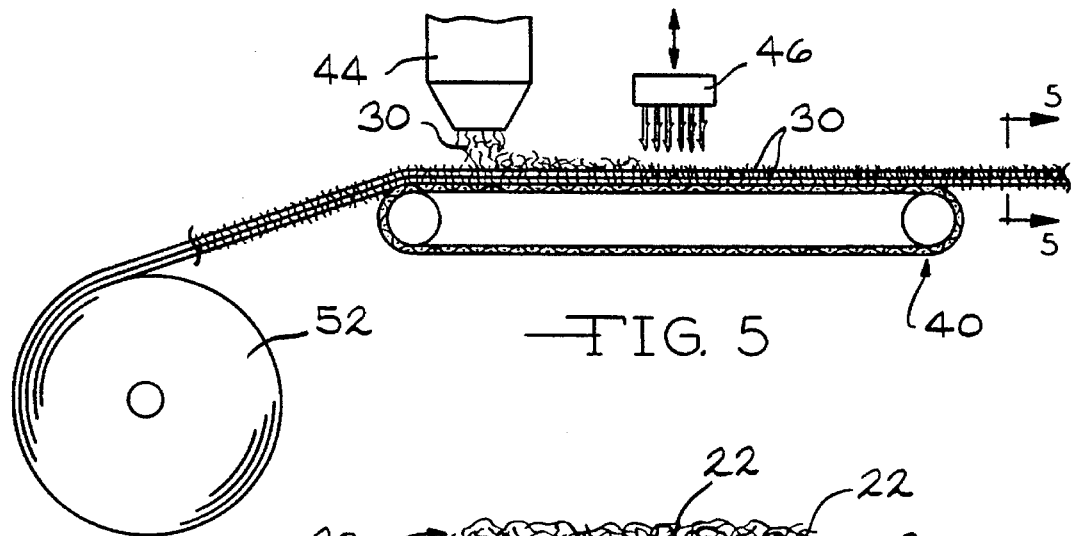
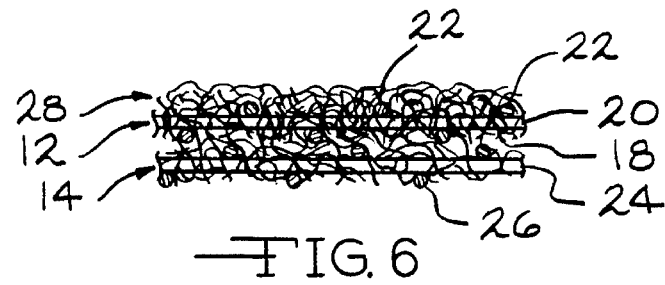
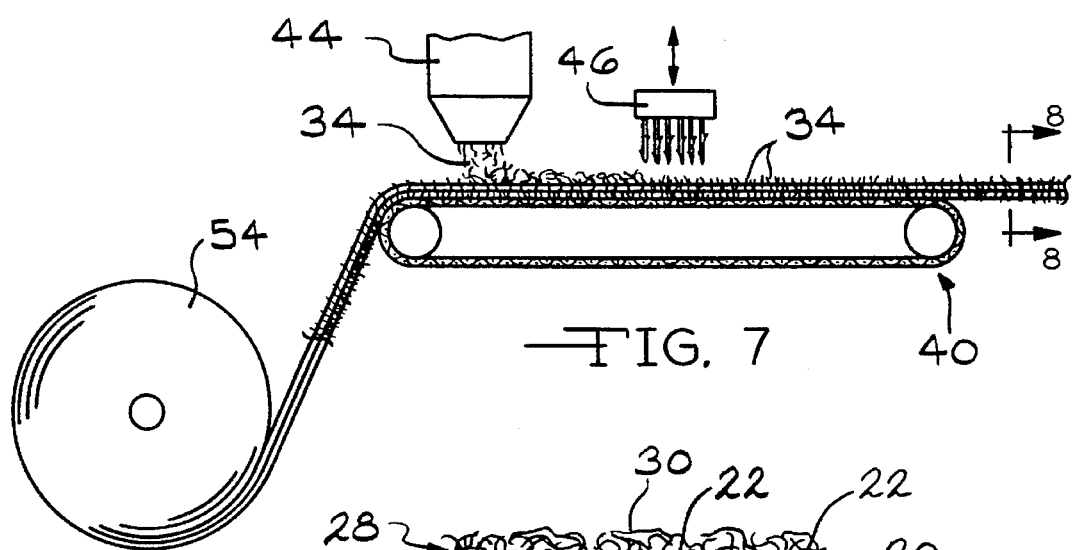
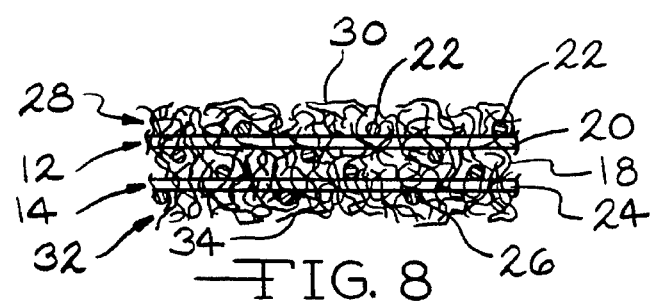

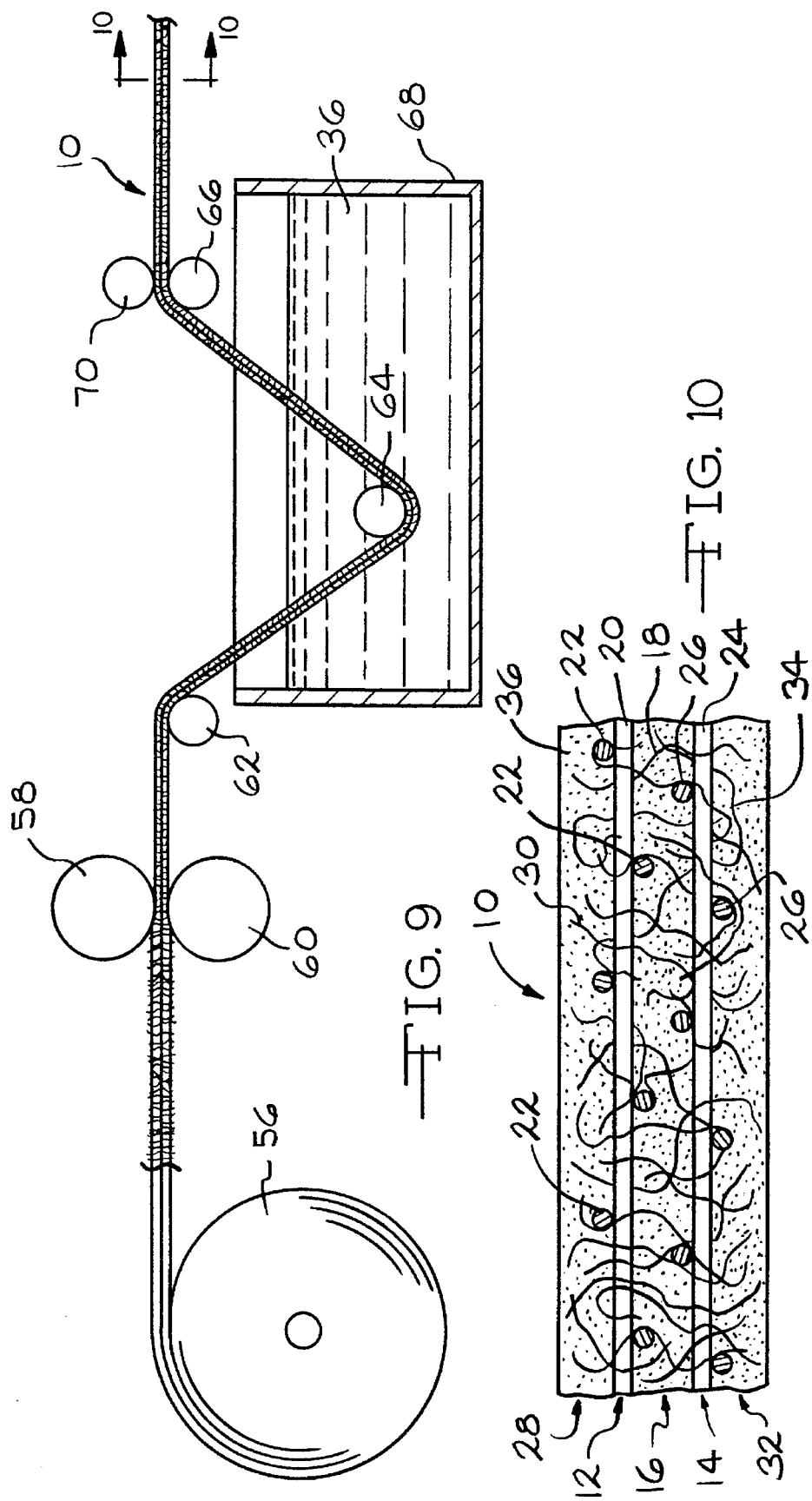

5,495,935

CONVEYOR BELTING AND METHOD OF MANUFACTURE

BACKGROUND OF THE INVENTION

1. Field of the Invention

The present invention relates to conveyor belting and to methods of manufacture of conveyor belting. More particularly, the belting of the present invention is a double-scrim belting comprising two spaced apart and generally parallel scrims having an intermediate fibrous material disposed therebetween.

One embodiment of the belting of the present invention comprises a first woven scrim and a spaced apart and substantially parallel second woven scrim connected by staple fibers consolidated together through entanglement and integrated with the scrims through entanglement, both entanglements being of the kind typically produced by needling. If desired, a non-woven web of staple fibers is needled to the outer surfaces of the scrims and the thusly formed belting can be encapsulated in a matrix of elastomeric material. If the belting is intended to be used to convey food grade products, an antimicrobial agent can be incorporated into the elastomeric material to inhibit bacterial growth. The textile yarns comprising the scrims and the fibrous layers can also have incorporated therein an antimicrobial agent.

In another embodiment of the double-scrim belting of the present invention, a fibrous layer is bonded between a pair of spaced apart and parallel scrims to form a laminated belting. Fibrous layers can be bonded to either or both of the outer major surfaces of the scrims and the resulting laminated belting can be encapsulated in an elastomeric material that can have an antimicrobial agent incorporated therein. The textile yarns comprising the scrims and the fibrous layers can also have an antimicrobial agent incorporated therein.

2. Prior Art

U.S. Pat. No. 4,154,335 to Burnett et al., which is assigned to the assignee of the present invention and incorporated herein by reference, describes a belting comprising a layer of staple fibers consolidated together through entanglement and integrated with a single layer open weave scrim through entanglement. Both entanglements are of the type produced by a needling operation. This belting can be calendared and heat set, followed by saturation with a polymeric elastomer material.

U.S. Pat. No. 4,157,752 to Sick et al. describes a belting comprising a layer of staple fibers consolidated together through entanglement and integrated with a single layer open weave scrim through entanglement. Both entanglements are of the type produced by a needling operation. This belting is encapsulated in a matrix of flexible elastomer or resin. Included in the integral structure is an impression wear surface of raised matrix material containing a portion of the consolidated staple fibers. This single scrim construction formed as an endless belting is not as sturdy under continuous duty conditions as the belting of the present invention.

U.S. Pat. No. 4,813,533 to Long describes a conveyor belting having a plurality of individual woven fabric layers having an intermediate non-woven mat or batt of entangled or spun-bonded staple fibers disposed therebetween. The non-woven fabric layer aids in absorption of a liquid polymeric resin saturant which encapsulates the fabric layers. However, the non-woven fabric layer is not needled to the woven fabric layers but instead is held together by reinforcing cords which join the fabric layers.

U.S. Pat. No. 3,190,137 Adams, Jr. describes a belting manufactured by depositing and adhering fiber-flock onto the unvulcanized rubber surface or rubber surface portions of the belting. The thusly constructed belting is then vulcanized whereby rubber flows around, immerses and bonds the fibers of the fiber-flock to provide a belting having a bonded fiber traction surface. In the belting of the present invention, the staple fibers are consolidated together and disposed intermediate the double scrims. This benefits belt wear under continuous duty conditions.

U.S. Pat. Nos. 4,787,516 to Morrison, 5,069,907 to Mixora et al. and 5,238,749 to Cueman et al. describe the use of the antimicrobial agent 5-chloro-2-(2,4-dichlorophenoxy) phenol to inhibit bacterial growth in various devise. However, the use of this antimicrobial agent in a belting is not disclosed.

SUMMARY OF THE INVENTION

The present invention thus describes a conveyor belting, which comprises at least two generally planar and parallel scrim means, each comprising a plurality of substantially parallel textile yarns; fibrous material provided to connect the two scrim means, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation; and a polymeric material encapsulating the two scrim means and the connecting fibrous material.

In another embodiment, the present invention describes a conveyor belting which comprises at least two generally planer and parallel scrim means, each comprising a plurality of substantially parallel textile yarns; a layer of fibrous material provided intermediate the two scrim means, the fibrous material being in the form of discrete staple fibers consolidated through entanglement of the individual fibers; and a bonding material provided between each of the scrim means and the intermediate fibrous material to thereby laminate the scrim means to the fibrous material.

Further, the present invention describes a method for manufacturing a conveyor belting, which comprises providing at least two generally planar and parallels scrim means, each comprising a plurality of substantially parallel textile yarns; connecting the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling; and encapsulating the scrim means and the connecting fibrous material by drawing them through a bath of polymeric material.

Still further, the present invention describes a method for manufacturing a conveyor belting, which comprises providing at least two generally planar and parallel scrim means, each comprising a plurality of substantially parallel textile yarns; providing a layer of fibrous material intermediate the scrim means, the fibrous material being in the form of discrete staple fibers consolidated through entanglement of the individual fibers; and laminating the intermediate fibrous material to the two scrim means with a bonding material adhering the fibrous material to each of the at least two scrim means.

BRIEF DESCRIPTION OF THE DRAWINGS

FIG. 5 is an elevational view illustrating the needling of a non-woven web of staple fibers 30 to the outer surface of the first scrim 12 previously connected to the second scrim 14.

FIG. 6 is a cross-sectional view along line 6—6 of FIG. 5.

FIG. 7 is an elevational view illustrating the needling of a non-woven web of staple fibers 34 to the outer surface of the second scrim 14 previously connected to the first scrim 12.

FIG. 8 is a cross-sectional view along line 8—8 of FIG. 7.

FIG. 9 is an elevational view of the belting shown in FIGS. 7 and 8 being subjected to a calendaring step and moved through a bath of elastomeric material 36.

FIG. 10 is an enlarged cross-sectional view along line 10—10 of FIG. 9.

DESCRIPTION OF THE PREFERRED EMBODIMENTS

Figure 1:
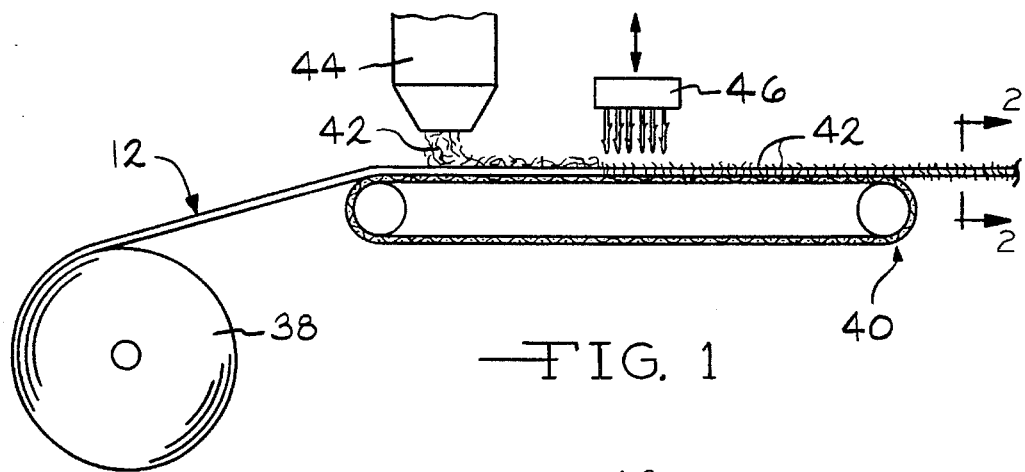
FIG. 1 is an elevational view illustrating the needling of a non-woven web of staple fibers 42 to a first woven scrim 12.

Referring first to FIG. 10, there is shown an enlarged cross-sectional view of a portion of the double-scrim belting 10 of the present invention comprising a first woven scrim 12, a spaced apart and substantially parallel second woven scrim 14 connected by a plurality of staple fibers 18 consolidated together through entanglement and integrated with the scrims 12 and 14 through entanglement, both entanglements being of the kind typically produced by a needling operation. While the belting in FIG. 10 is shown comprising two scrims 12 and 14 as the strength members connected by staple fibers 18, it is contemplated by the scope of the present invention that the present belting can comprise a plurality of substantially parallel woven scrims, each pair of adjacent scrims connectedly intermediate staple fibers 18. In that respect, the double scrim belting 10 is for illustrative purposes only, and the present invention is not intended to be so limited. If desired, an intermediate layer of staple fibers 16 can be provided connecting the double scrims 12 and 14 (FIGS. 4A and 10) to build up the thickness of the resulting belting 10.

The first woven scrim 12 includes longitudinally extending or lengthwise warp yarns 20 which are preferably textile yarns and laterally extending or crosswise weft yarns 22, which may be, for example spun polyester yarns. The second scrim 14 is preferably similar to the first scrim 12, and likewise has lengthwise or longitudinally extending warp yarns 24, which are preferably textile yarns and laterally extending or crosswise weft yarns 26, which may be, for example spun polyester yarns. The connecting staple fibers 18 are, for example, polyester fibers consolidated to scrims 12 and 14 through needling entanglement.

If desired, a non-woven web of staple fibers is needled to either or both the outer surface of the first scrim 12 to form a first outer layer 28 of consolidated staple fibers 30 and to the outer surface of the second scrim 14 to form a second outer layer 32 of consolidated staple fibers 34. The dense, fibrous layers 28 and 32 entangled with scrims 12 and 14 serve as the respective first and second major surfaces of the belting 10. For illustrative purposes, only a few staple fibers 18, 30 and 34 are shown in FIG. 10.

In the preferred embodiment of the present belting 10, the connecting staple fibers 18, the scrims 12 and 14 and the first and second major fibrous surfaces 28 and 32 are completely encapsulated in a matrix of an elastomeric material 36. There is a high degree of bonding between the elastomer 36, the scrims 12 and 14, and the staple fibers 18, 30 and 34.

The preferred process for manufacturing the belting 10 of the present invention will now be described in greater detail. In that respect, FIGS. 1, 3, 5, 7 and 9 show the various steps in the manufacturing process of the belting 10 of the present invention and FIGS. 2, 4, 6, 8 and 10 show cross-sectional views of a portion of the present belting after completion of each of the respective manufacturing steps.

As particularly shown in FIG. 1, the first step in the manufacturing process involves providing a bolt of fabric 38 of the first scrim 12 (FIG. 2) comprising a plurality of substantially parallel lengthwise or warp textile yarns 20 woven or knitted with a plurality of crosswise or weft yarns 22. That the scrim 12 is woven or knitted is not essential as long as the warp yarns 20 are independent of each other, and for the most part, do not cross over each other indiscriminately. The warp textile yarns 20 should have a relatively high tensile breaking strength, for example on the order of at least about 20 lbs. per inch and preferably greater than 50 lbs. per inch. Advantageously, the warp textile yarns 20 will have low stretch properties, for example on the order of at least about 4 percent to 5 percent (½ nominal breaking load) to about 15 percent to 20 percent. Further, it is important that the warp yarns 20 exhibit uniformity in their shrink characteristics, i.e., warp yarns of a high degree of shrinkability should not be mixed with warp yarns of a low degree of shrinkability to minimize buckling or cockling of the finished belting 10. In that respect, the warp yarns 20 may be selected from a wide variety of synthetic yarns, such as polyester, polyamide and like yarns. Preferably the warp yarns 20 will be spun yarns or the like having a tendency to absorb and hold the polymeric elastomeric material 36 (FIG. 10).

One preferred embodiment of the present invention comprises the lengthwise or warp textile yarns 20 and the crosswise or weft yarns 22 being provided in an open weave cloth as the scrim 12. Any weave may be used, a plain weave being stable and therefore advantageous. In this embodiment, the nature of the crosswise or weft yarns 22 is not critical and the weft yarns 22 can comprise any conventional synthetic or natural fiber yarns. Advantageously, the denier of the warp and weft yarns and the density of the weave is selected to provide a scrim weight of from between about 4 oz./square yard to about 40 oz./square yard for optimum strength.

Figure 2:
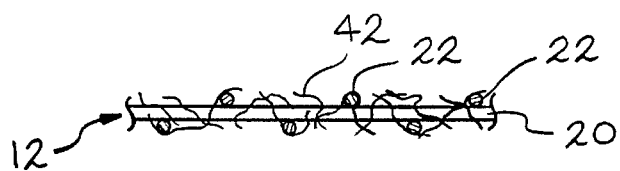
FIG. 2 is a cross-sectional view along line 2—2 of FIG. 1.

The unrolled scrim 12 is moved onto and supported by a conventional conveyor 40 rotating in a clockwise direction, as shown with respect to the orientation of FIG. 1 moving the cloth scrim 12 from left to right. Discrete staple fibers 42, such as are provided in a non-woven web of fibrous batt, are spread in a generally uniform distribution over the upper surface of the scrim 12 from chute 44. A needling apparatus 46 serves to consolidate the staple fibers 42 through entanglement and to thereby integrate the staple fibers 42 to the scrim 12 (FIG. 2). If desired, this step can be repeated to build up the density and thickness of the layer of staple fibers 42 needled to scrim 12.

The batts may be of randomly oriented staple fibers such as synthetic polyamide, polyester, polyolefin, acrylic and like fibers including blends thereof and natural fibers such as jute and blends thereof. Optionally, the fibers may be directionally oriented within the batt by methods known to those skilled in the art.

The batts of staple fibers selected for needling to the textile yarns advantageously have a weight of from between about 2 oz./square yard to 100 oz./square yard. The staple fibers may have a wider denier range than that which is preferred for the warp and weft yarns. The batts may be preneedled using conventional techniques to obtain some integrity of the staple fibers prior to needling the batt to the scrims.

The techniques of needling fibrous batts of staple fibers to scrims woven or knitted from textile yarns are well known and details need not be recited here. The coarseness of the belting needles used, the barb configurations, number, size and other variables are dependent somewhat on the degree of openness between the textile yarns, so as to avoid rupture of the textile yarns. In general, a No. 28 gauge needle is preferred, with the barbs oriented so as not to tear the lengthwise yarns. The needling frame may be fitted with either high or low density needle boards, a 34 density board being illustrative. Needling is preferably carried out to produce a needled fabric scrim 12 having a weight within the range of from between about 6 oz./square yard to about 90 oz./square yard.

After completion of the first needling step, the thusly processed scrim 12 (FIG. 2) is rolled-up into a bolt 48 (FIG. 3) and moved to the next step in the process. There, the needled scrim 12 is connected to the second scrim 14 unrolling from bolt 50. Scrim 14 is similar to scrim 12 and, as previously discussed, is comprised of longitudinally extending warp textile yarns 24 woven or knitted with a plurality of crosswise or weft yarns 26 in an open weave cloth. Again, it is important that the warp textile yarns 24 of scrim 14 have a relatively high tensile strength, low stretch properties and exhibit uniformity in their shrink characteristics similar to the warp textile yarns 20 of scrim 14.

Figure 3:
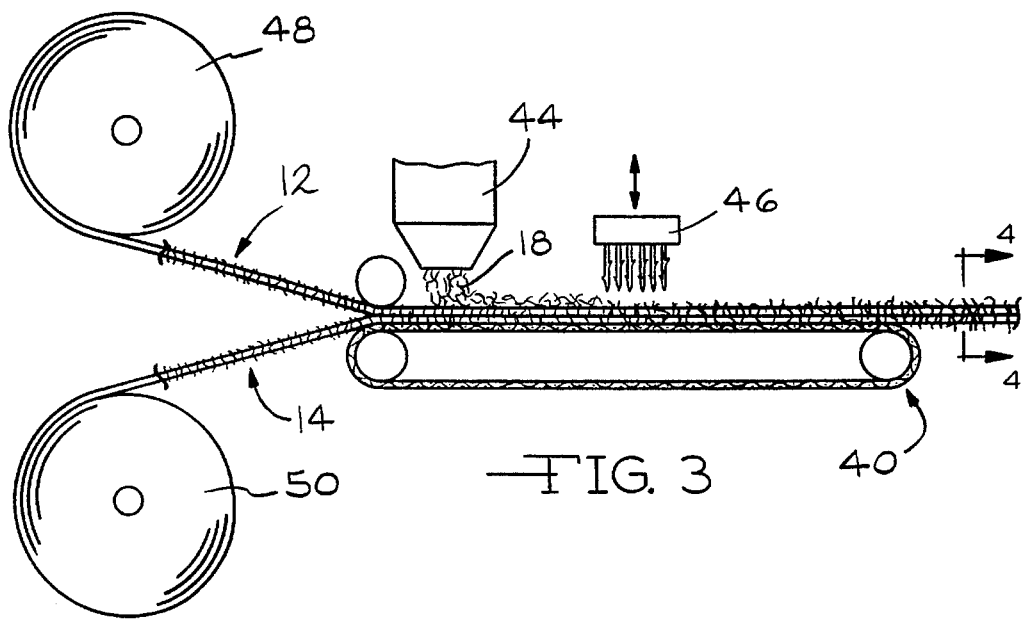
FIG. 3 is an elevational view illustrating the needling of a non-woven web of staple fibers 18 to a second woven scrim 14 overlaying the first scrim 12 to hereby connect the scrims.
Figure 4A:
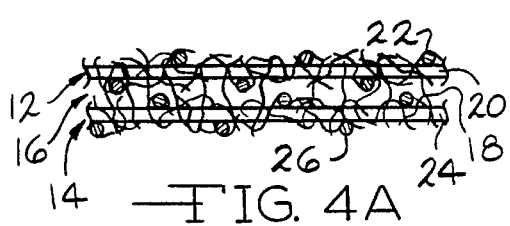
FIG. 4A is a cross-sectional view similar to that shown in FIG. 4 but having an intermediate layer 16 of staple fibers provided between the connected scrims 12 and 14.
Figure 4:
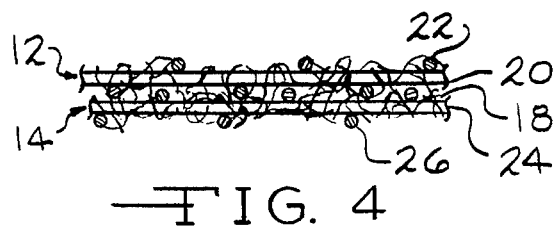
FIG. 4 is a cross-sectional view along line 4—4 of FIG. 3.

The scrims 12 and 14 are preferably of a similar width and are positioned in an overlaying relationship, supported on conveyor 40. Conveyor 40 again rotates in a clockwise direction as shown in the orientation of FIG. 3, transferring the overlaid scrims 12 and 14 from left to right. Discrete staple fibers 18, similar to fibers 42 shown in FIGS. 1 and 2 and of the kind that are provided in a non-woven web of fibrous batt are spread over the upper surface of scrim 12 from chute 44 in a generally uniform distribution. The needling apparatus 46 serves to consolidate the staple fibers 18 through entanglement and to carry a portion of the staple fibers 18 to a position intermediate the scrims 12 and 14 to thereby connect the scrims 12 and 14 in a substantially parallel and spaced apart relationship (FIG. 4). If desired, a non-woven web of staple fibers (not shown) can be fed between the unrolling scrims 12 and 14 to further build up the density and thickness of the connecting staple fibers 18 (FIG. 4A).

It should be understood that the scrims 12 and 14 need not necessarily be pre-needled before they are connected by the staple fibers 18. In that respect, scrims 12 and 14 are connected by the staple fibers 18 without having first undergone the processing step shown in FIG. 1 wherein the staple fibers 42 are first needled to each scrim 12 and 14 before the scrims are connected. Whether the scrims 12 and 14 are pre-needled before they are connected, as previously discussed, a non-woven web of staple fibers (not shown) can be fed between the unrolling scrims. This intermediate web can serve as the connecting staple fibers or additional staple fibers 18 can be spread on the uppermost scrim and carried between the scrims by the needling operation. Also, only one of the scrims can be pre-needled.

Next, a bolt of fabric 52 of the double-scrim belting completed up to the process step shown in FIG. 3 is unrolled onto the clockwise rotating conveyor 40 as a non-woven web of staple fibers 30, distributed evenly over the upper surface of the first scrim 12 from chute 44, is needled thereto by the needling apparatus 46. This forms the dense, fibrous outer layer 28 of consolidated staple fibers 30 entangled with scrim 12 connected to the second scrim 14 by the previously described connecting fibers 18. If desired, this step can be repeated to build up the density and thickness of the outer layer 28 of staple fibers 30 needled to scrim 12.

If desired, a bolt of fabric 54 of the thusly completed belting is unrolled onto the clockwise rotating conveyor 40 and a non-woven web of staple fibers 34 is needled to the second scrim 14 by the needling apparatus 46 to form the second dense, fibrous outer layer 32, as shown in FIG. 8. Again, this step can be repeated to build up the density and thickness of the outer layer 32 of staple fibers 34 needled to scrim 14. If staple fibers are needled only to the outer surfaces of one of the scrims, i.e., only to the outer surface of either scrim 12 or 14, fibers from the connecting staple fibers 18 are carried to the outer surface of the opposite scrim to produce a light "nap" or fuzz of loose fiber ends on that side.

Following needling, it is advantageous to calendar those needled beltings wherein further consolidation is desired, particularly in those beltings where a web of staple fibers is needled to the outer surface of only one of the scrims. In that respect, the calendaring step serves to further compact and consolidate the staple fibers to reduce fluid permeability of the needled belting. This enhances retention of the liquid elastomeric material 36 received by the needled belting 10 in the saturation step. Generally, it is desirable to have a belting ready for saturation, characterized by its ability to accept and retain the elastomeric liquid precursor until solidification occurs. If the needled belting lacks this characteristic, calendaring may be advantageous. Calendaring is not generally necessary if webs of staple fibers have been needled to both outer surfaces of the double-scrim belting, i.e., the belting shown in FIGS. 7 and 8.

In that manner, a bolt of fabric 56 of the double-scrim belting leaving the process step shown in FIG. 7 is fed through a pair of counter rotating calendar rollers 58 and 60 that serve to calendar and densify the belting. Preferably, the rollers 58 and 60 are heated to further aid in the calendaring step.

If desires, the needled and possibly calendared belting 10 is heat set in an oven (not shown) to selectively shrink the fabric comprising the scrims 12 and 14 before the belting 10 is subjected to the saturation step. During heat setting, the fabric may be tensioned in the lengthwise direction (along the axis of the textile yarns) under from between about 0.5 lbs. per inch to about 20 lbs. per inch or more of width. This eliminates a large degree of stretching in the final product, and obviates wrinkles across the width and along the length of the belting 10 of the present invention. Heat setting is carried out under hot air temperatures dependent on the nature of the fibers and yarns employed in the needled fabric scrims. Those skilled in the art will know which temperatures to select. For example, when the warp and weft yarns and staple fibers comprise polyester, heat setting may be carried out at temperatures within the range of from between about 300° F. to 420° F.

The calendared belting exiting the calendar rollers 58 and 60 is guided by rollers 62, 64 and 66 into and out of a vessel or tank 68 containing a solution of the polymeric elastomer material 36. The depth of roller 64 below the level of liquid elastomer 36 in tank 68 controls the exposure time of belting 10 to the elastomeric material 36. The belting 10 leaving container 68 is now saturated with the liquid elastomeric material 36 and if needed, a fourth roller 70 can be provided in conjunction with roller 66 to squeegee or wipe excess liquid elastomer from the belting. It will be appreciated that a single trip through tank 68 may suffice for saturating some beltings, while multiple saturation steps with intermediate squeeging or partial drying steps may be required to fully saturate dense fibrous layers in other needled beltings.

A wide range of liquid polymeric saturants may be employed. Representative are the liquid precursors of polyurethane, polyvinyl chloride, neoprene, styrene-butadiene and like non-cellular polymeric resins. Particularly preferred polymeric saturants are the liquid carboxylated acrylonitrile-butadiene copolymer latex resins. The acrylonitrile-butadiene copolymer elastomers formed from them are highly flexible, crack-resistant even at low temperatures and form strong bonds with the textile components of the fabric scrims of the invention. Liquid polymeric saturants without carriers and or solvents may be used, however, a latex polymeric saturant employing a water carrier is advantageous. Liquid saturants employing organic solvents and carriers can also be used as those skilled in the art will appreciate.

Desirably, the saturation of the heat set and needled belting 10 will provide high loading of elastomer, substantially penetrating the textile fabric scrims 12 and 14 so as to encapsulate the intermediate fibrous layer 16. Advantageously, the majority of voids in the textile fabric scrims and in the various fibrous layers are filled with the elastomeric material 36 so that elastomer is distributed throughout the body of the final product. Preferably, the saturation of the belting 10 of the present invention will be such that the cured elastomeric material 36 constitutes from between about 50 percent to about 500 percent, preferably 100 percent to 350 percent of the belting weight.

Preferably, an effective amount of an antimicrobial biocidal or biostatic substance, such as chlorinated phenol is incorporated into the polymeric elastomeric material 36. The antimicrobial biocidal or biostatic substance is 5-chloro-2-(2,4-dichlorophenoxy) phenol. This antimicrobial biocidal or biostatic substance is non-toxic and free of heavy metals. An alternative antimicrobial agent that meets this criteria is polyhexamethylene biguanide hydrochloride (PHMB). Other chemical compounds having known antimicrobial biocidal or biostatic tendencies may also be used.

The antimicrobial agent is put into powder form and mixed with the thermoplastic material. From 1 to 9 percent by weight of the total powder comprises the antimicrobial substance. Preferably the antimicrobial biocidal or biostatic substance is from 2 to 5.5 percent by weight of the thermoplastic powder into which it is incorporated. The antimicrobial agent will migrate through the polymer to the surface from the amorphous zones of the polymer until equilibrium of the antimicrobial agent's internal vapor pressure is reached. If the antimicrobial substance on the surface of the coating is removed by friction or other means, more antimicrobial agent will move to the surface until the agent's internal vapor pressure is once again at equilibrium. Incorporating the antimicrobial agent into the polymeric elastomeric material 36 inhibits bacterial growth and promotes asepsis on the belting surface. This is especially advantageous when the belting 10 is used to convey food grade products, such as eggs, poultry, vegetables and the like. An alternative approach is to spray or otherwise apply a surface coating of the antimicrobial agent to the belting 10 at any step along the manufacturing process as shown in FIGS. 1, 3, 5 and 7 or the yarns 20 and 22 are coated with the antimicrobial agent before they are woven or knitted into the scrims 12, 14. For a more detailed discussion of the use of the antimicrobial agent in a coating process, reference is made to U.S. Pat. No. 5,238,749 to Cueman et al., and to use of the antimicrobial agent in a surgical drape, reference is made to U.S. Pat. No. 5,069,907 to Mixor et al., the disclosures of which are incorporated herein by reference.

The next step in the method of the present invention comprises curing the elastomeric material 36 in-situ. Curing may be affected by any means appropriate for the elastomeric saturant. For example, by heat for heat curable elastomers. Advantageously the saturated belting 10 is passed through a heated platen press at a temperature sufficient to cure the elastomeric material 36, and if desired, the saturated belting 10 is simultaneously pressed. Pressures of from between about 50 lbs./square inch to about 200 lbs./square inch are practical and illustrative of pressures which may be employed. Preferably the saturated belting 10 is pressed and cured under pressures of from about 90 lbs./square inch to 130 lbs./square inch.

Figure 11:
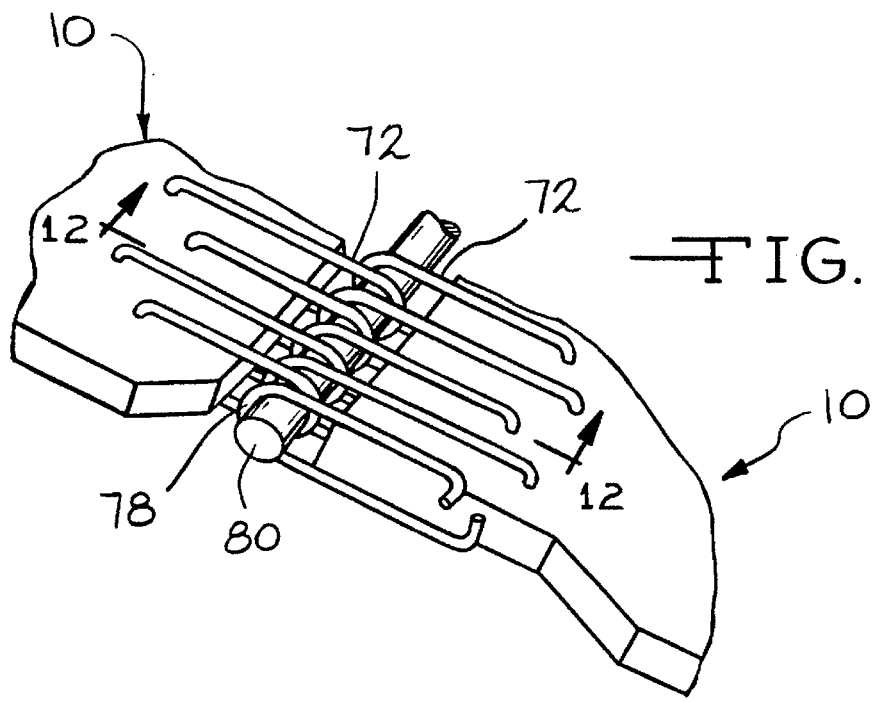
FIG. 11 is a fragmentary perspective view of the double-scrim belting 10 of the present invention without the encapsultary elastomer material 36 and spliced to form an endless belting.
Figure 12:
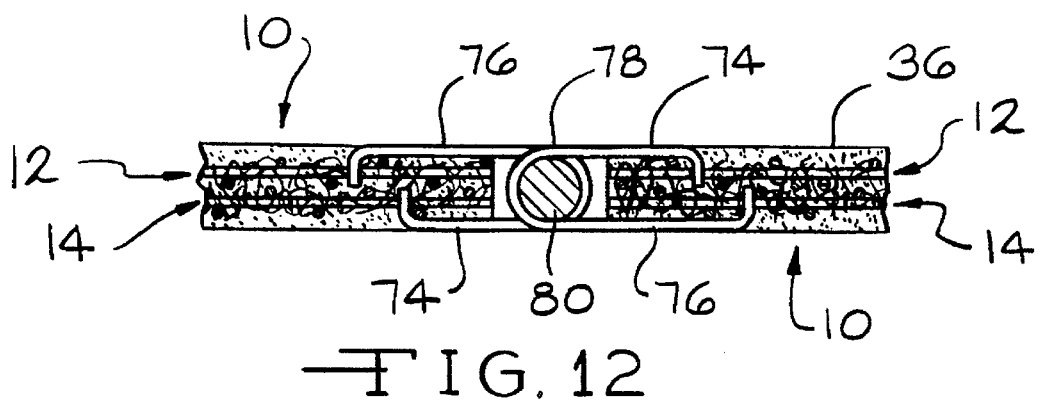
FIG. 12 is a cross-sectional view along line 12—12 of FIG. 11 but with the belting 10 encapsulated in the elastomeric material 36.

FIGS. 11 and 12 show the belting 10 of the present invention spliced into an endless belt for use in transporting objects as part of a conveyor system (not shown). However, FIG. 11 shows the spliced belting 10 without the encapsulating elastomeric material 36 and FIG. 12 shows the spliced belting 10 encapsulated in the elastomeric material 36.

To form the endless belting, a plurality of hook-type fasteners 72, each having a short leg 74 and a long leg 76 are first set into the belting 10. The spike ends of the fasteners 72 are driven into the belting 10 in alternating orientation with a short leg 74 of one fastener 72 disposed between the long legs 76 of two adjacent fasteners 72 and with the loop 78 of the various fasteners 72 spaced laterally equidistant from the belting edge and spaced longitudinally equidistant along the length of the edge of the belting 10. However, the fasteners 72 provided at each belting 10 end are staggered so that the fasteners 72 set into one end of the belting 10, are disposed intermediate and evenly spaced between the fasteners 72 set into the other end of the belting 10. The splicing process is completed with a pivot rod 80 that is captured between the loops 78 of the various fasteners 72 to serve to connect the belting ends in an endless manner and provide for hinging movement as the belting 10 travels over a conveyor mechanism (not shown).

As particularly shown in FIG. 12, the double-scrim construction of the belting 10 of the present invention provides a structure that has increased strength and durability at the splicing zone. The opposite spike ends of each fastener 72 are set into scrims 12 and 14, which independently serve as the strength members of the belting. That way, the pulling, tugging and tensile forces that are brought to bear on the legs of each fastener 72 are evenly distributed to the spaced apart scrims 12 and 14. Each scrim 12, 14 absorbs a fraction of the tensile load that would normally be experienced in a single scrim construction. Thus, the belting 10 of the present invention is better able to hold up to continuous duty as compared to prior art belting. The intermediate connecting staple fibers 18 also help to dissipate the tensile forces to further prolong the useful life of the belting 10. The belting 10 of the present invention not only benefits maintenance costs, but can have significant advantages in reduced operation down time.

In particular embodiments of the invention, the yarns and elastomeric components of the belting 10 may be selected to provide electrical conducting properties. For example, by appropriate selection of electrically conductive materials, the conveyor belting 10 of the present invention can facilitate the discharge of static electrical energy in a well-grounded conveyor system. For example, the elastomeric material 36 may be compounded to include as filler, carbon black and graphite particle fillers to render the belting electrically conductive. Such beltings have been known to obtain surface electrical resistances of from $1\times10^7$ ohms to $1\times10^4$ ohms at 400 volts. This property is particularly advantageous for conveying electrical components.

Depending on the density of the weave of the scrim cloths and the various fibrous layers, the belting 10 can be provided with some voids that are not filled with the elastomeric material 36. The unfilled voids provide the belting 10 with insulative properties and also provide for a quiet running belting 10 in use.

If desired, at least one and preferably both of the upper and lower belt surfaces are abraded away to impart a unique and uniform surface and to make a belting 10 of uniform thickness. Additionally, the abrasion process provides the belting having a reduced coefficient-of-friction in contact with the belt drive mechanism. Abrasion may be carried out using conventional abrading apparatus and techniques. For example, the belting 10 of the present invention may be passed under a rotating abrasive cylinder and in surface contact therewith. Advantageously the abrasion process utilizes a grit range of from 50 to 600, preferably 100 to 250. This provides a final belting product of uniform thickness, having a felt-like surface appearance.

U.S. Pat. No. 4,369,081 to Curry et al. describes a laminated foam-fabric belting having a layer of batting needled into the foam and substrate fabric to form an integral laminated belting. However, this prior art belting is not encapsulated in an elastomeric saturant and neither is it a double-scrim belting. The advantage of an abraded, double-scrim elastomeric material belting is that the abrasion process acts to "free" the tips of the staple fibers from the encapsulating saturant to provide a felt-like nap while the elastomeric material 36 surrounds the major portion of the staple fibers to provide a belting that can withstand continuous duty without deteriorating and losing its nap.

This abraded characteristic gives the belting 10 of the present invention superior wicking characteristics to absorb oil and the like. The oil is drawn up and moved into the interior of the belting by capillary action of the oil along the staple fibers. The intermediate staple fibers 18 serve as a "reservoir" so that the belting 10 of the present invention does an increased absorption capacity over prior art belting. Additionally, the surface is soft, resilient, sound-absorbent and offers resistance to damaging articles conveyed on it.

Figure 13:
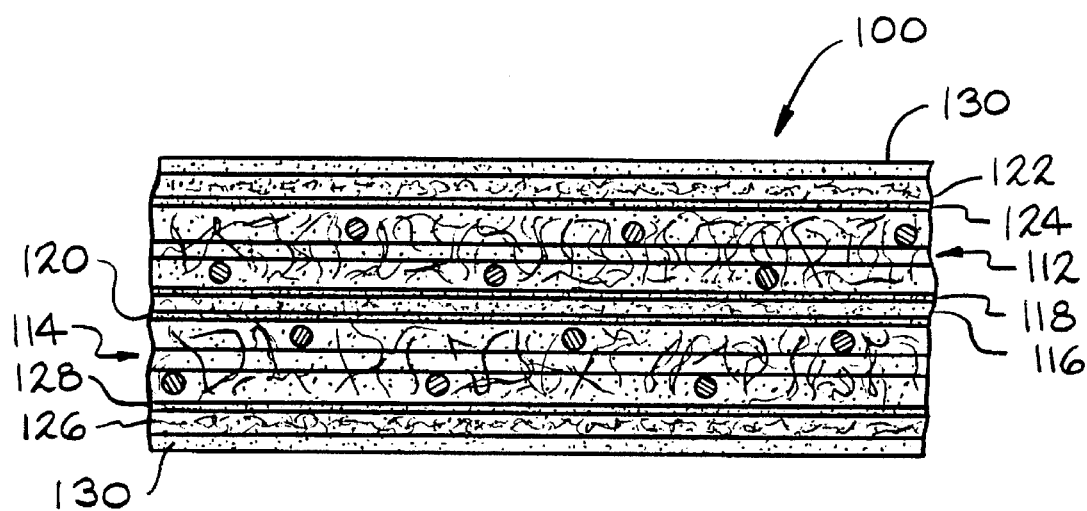
FIG. 13 shows another embodiment of the double-scrim belting 100 of the present invention comprising a laminated belting.

FIG. 13 shows another embodiment of the double-scrim belting 100 of the present invention. Belting 100 is a laminate comprising a first woven scrim 112, a spaced apart and substantially parallel second woven scrim 114 and an intermediate layer of consolidated staple fibers 116. The staple fibers are preferably consolidated together through entanglement of the type formed by a needling operation. The layer of staple fibers is integrated or adhered to the scrims 112 and 114 by respective layers of bonding material, indicated as layer 118 bonding between scrim 112 and the fibrous layer 116 and layer 120 bonding between scrim 114 and the fibrous layer 116. The scrims 112 and 114 are similar in construction to previously described scrims 12 and 14 and fibrous layer 116 is similar to the layer of staple fibers 16 provided to connect the scrims 12 and 14. The layers 118 and 120 of bonding material comprise either an elastomeric material similar to the previously described encapsulating elastomeric material 36 or an adhesive material, as is well known to those skilled in the art. The bonding layers 118 and 120 are preferably between about 10 to 15 mils thick. The thusly formed laminated belting is preferably calendared followed by a heat setting step to insure an integral construction.

If desired, an outer fibrous layer is bonded or adhered to either or both the outer surfaces of scrims 112 and 114. This construction forms a first outer layer 122 of staple fibers laminated to the outer surface of the first scrim 112 by bonding layer 124 and a second outer layer 126 of staple fibers laminated to the outer surface of the second scrim 114 by bonding layer 128. Additional outer layers (not shown) of staple fibers can be bonded to either or both of the outer layers 122 and 126.

If desired, the double-scrim belting 100 is encapsulated in a matrix of elastomeric material 130. It is also contemplated by the scope of the present invention that the elastomeric material 130 can be provided with conductive adhesives or with antimicrobial additives, as previously described with respect to belting 10. Also, the upper and lower belt surfaces can be abraded to provide the belting 100 having the abraded characteristics described with respect to the belting 10 including reduced coefficient-of-friction surfaces.

In the belting 100 shown in FIG. 14, there is a high degree of bonding between the elastomeric material 126, the scrims 112 and 114, the layers of staple fibers 116, 122 and 126, and the bonding layers 118, 120, 124 and 128. As was the case with the belting 10, this provided unexpected and unobvious benefits when an endless belting is constructed from the double-scrim belting. In an endless belting, the generated tensile forces at the fastened zone are distributed between two scrims 112, 114 which in turn are integrally bonded to the intermediate fibrous layer 116. This construction exhibits superior wear characteristics in comparison to other types of prior art belting under continuous duty conditions.

It is intended that the foregoing description be only illustrative of the present invention and that the present invention be only limited by the hereinafter appended claims.

What is claimed is:

1. A conveyor belting, which comprises:
   a) at least two generally planar and parallel scrim means, each comprising a plurality of substantially parallel textile yarns;
   b) fibrous material provided intermediate the two scrim means, the fibrous material being in the form of discrete staple fibers consolidated together through entanglement of the individual fibers and the discrete staple fibers being integrated with the yarns comprising the scrim means by entanglement of the fibrous material therewith to connect the two scrim means together, both entanglements being of the character produced by a needling operation; and
   c) a polymeric material encapsulating the adjacent scrim means and the connecting fibrous material.

2. The conveyor belting of claim 1 wherein the connecting fibrous material is provided as a layer of fibrous material connecting the two adjacent scrim means.

3. The conveyor belting of claim 1 wherein there is further provided an outer layer of fibrous material formed of discrete staple fibers consolidated with the exposed outer surface of at least one of the outermost scrim means through entanglement of the individual fibers comprising the outer layer and through needling entanglement with the yarns comprising the scrim means, and wherein the adjacent scrim means, the connecting, intermediate fibrous material and the outer layer of fibrous material are encapsulated in the synthetic polymeric material.

4. The belting of claim 3 wherein the outer layer of fibrous material is formed by needling a non-woven web of staple fibers to each of the exposed outer surfaces of the outermost scrim means.

5. The belting of claim 1 wherein the textile yarns are incorporated in a cloth as the scrim means.

6. The belting of claim 5 wherein the textile yarns comprise lengthwise yarns provided in a knitted cloth as the scrim means.

7. The belting of claim 5 wherein the textile yarns comprise lengthwise yarns provided in a woven cloth as the scrim means.

8. The belting of claim 1 wherein the textile yarns are polyester.

9. The belting of claim 1 wherein the staple fibers are polyester.

10. The belting of claim 1 wherein the polymeric material comprises a latex.

11. The belting of claim 10 wherein the latex is an acrylonitrile-butadiene copolymer.

12. The belting of claim 1 wherein either or both the textile yarns and the polymeric material contain an effective antimicrobial amount of an antimicrobial compound to inhibit bacterial growth on the belting.

13. The belting of claim 3 wherein the encapsulated outer layer of fibrous material is provided with an abraded finish that serves to wear away a surface portion of the polymeric material to a generally uniform depth to expose end portions of the fibrous material comprising the outer layer.

14. The belting of claim 1 wherein the polymeric material is provided with an electronically conductive additive.

15. The belting of claim 14 wherein the electronically conductive additive is selected from the group consisting of carbon black, graphite and combinations thereof.

16. The conveyor belting of claim 1 wherein opposed ends at the longitudinal extent of the belting are connected by fastener means to form an endless belting.

17. The conveyor belting of claim 16 wherein the fastener means comprise hook-type fasteners having spaced apart legs extending from a loop portion of the fastener and wherein at least two fasteners are attached to each end of the belting with the spaced apart legs of each fastener secured to one of the two scrim means comprising the belting, and wherein the fasteners provided at each end are joined by a pivot rod means captured between the loop portion of the fasteners provided at each end of the belting.

18. A conveyor belting, which comprises:
   a) at least two generally planar and parallel scrim means, each comprising a plurality of substantially parallel textile yarns;
   b) a layer of fibrous material provided intermediate the two scrim means, the fibrous material being in the form of discrete staple fibers consolidated together through entanglement of the individual fibers; and
   c) a bonding material provided between each of the scrim means and the intermediate fibrous material to thereby connect them together to form a laminate of the scrim means and the intermediate fibrous material.

19. The belting of claim 18 wherein either or both the textile yarns and the bonding material contain an effective antimicrobial amount of an antimicrobial compound to inhibit bacterial growth on the belting.

20. The conveyor belting of claim 18 wherein a polymeric material encapsulates the at least two scrim means and the intermediate fibrous layer laminated between the scrim means.

21. The conveyor belting of claim 18 wherein there is further provided an outer layer of fibrous material formed of discrete staple fibers consolidated through entanglement of the individual fibers and laminated to the exposed outer surface of at least one of the outermost scrim means by the bonding material provided between the scrim means and the outer fibrous layer.

22. The conveyor belting of claim 21 wherein a polymeric material encapsulates the laminate comprising the intermediate scrim means bonded between the at least two scrim means and the outer layer of fibrous material laminated to the exposed outer surface of at least one of the outermost scrim means.

23. A method for manufacturing a conveyor belting, which comprises:
   a) providing at least two generally planar and parallel scrim means, each comprising a plurality of substantially parallel textile yarns;
   b) connecting the scrim means in a needling step wherein an intermediate fibrous material in the form of discrete staple fibers is consolidated together through entanglement of the individual fibers by the needling and the discrete staple fibers are integrated with the yarns comprising the at least two scrim means to connect the scrim means together by entanglement of the fibrous material therewith during the needling; and
   c) encapsulating the scrim means and the connecting fibrous material by drawing them through a bath of polymeric material.

24. The method of claim 23 wherein the connecting fibrous material is provided as a layer of fibrous material connecting the two adjacent scrim means.

25. The method of claim 23 including the step of needling an outer layer of fibrous material formed of discrete staple fibers to the exposed outer surface of at least one of the outermost scrim means through entanglement of the individual fibers comprising the outer layer and through needling entanglement of the fibrous material with the yarns comprising the scrim means.

26. The method of claim 25 including needling the outer layer of fibrous material to each of the exposed outer surfaces of the outermost scrim means.

27. The method of claim 23 wherein the textile yarns are incorporated in a cloth as the scrim means.

28. The method of claim 27 wherein the textile yarns comprise lengthwise yarns provided in a knitted cloth as the scrim means.

29. The method of claim 27 wherein the textile yarns comprise lengthwise yarns provided in a woven cloth as the scrim means.

30. The method of claim 23 wherein the textile yarns are polyester.

31. The method of claim 23 wherein the staple fibers are polyester.

32. The method of claim 23 wherein the polymeric material comprises a latex.

33. The method of claim 32 wherein the latex is an acrylonitrile-butadiene copolymer.

34. The method of claim 23 further inhibiting bacterial growth on the belting by incorporating an effective antimicrobial amount of an antimicrobial compound into either or both the textile yarns and the polymeric material.

35. The method of claim 23 wherein the textile yarns extend longitudinally along the length of the scrim means and further including the step of tensioning the scrim means and the connecting fibrous material in the longitudinal direction under a force of from between about 0.5 lbs. to about 20 lbs. per inch of fabric width.

36. The method of claim 35 further including the step of heat setting the scrim means and the connecting fibrous material while under the tensioning force.

37. The method of claim 23 further including a step of curing the polymeric material.

38. The method of claim 37 wherein the curing step is carried out by moving the saturated belting through a hot air oven.

39. The method of claim 25 including the step of abrading an exposed surface portion of the polymeric material to a generally uniform depth and to an extent sufficient to expose end portions of the fibrous material comprising the outer layer.

40. The method of claim 23 including the step of providing the polymeric material is provided with an electronically conductive additive.

41. The method of claim 40 wherein the electronically conductive additive is selected from the group consisting of carbon black, graphite and combinations thereof.

42. The method of claim 23 further including the step of connecting opposed ends along the longitudinal axis of the belting using fastener means to form an endless belting.

43. The method of claim 42 wherein the fastener means comprise hook-type fasteners having spaced apart legs extending from a loop portion of the fastener and wherein connecting the opposed ends of the belting includes attaching at least two fasteners to each end of the belting by securing the spaced apart legs of each fastener to one of the two scrims means comprising the belting and then joining the fasteners provided at each end by a pivot rod means captured between the loop portion of the fasteners provided at each end.

44. A method for manufacturing a conveyor belting, which comprises:

(a) providing at least two generally planar and parallel scrim means, each comprising a plurality of substantially parallel textile yarns;

(b) providing a layer of fibrous material intermediate the scrim means, the fibrous material being in the form of discrete staple fibers consolidated through entanglement of the individual fibers; and (c) laminating the intermediate fibrous material to the two scrim means with a bonding material adhering the fibrous material to each of the at least two scrim means.

45. The method of claim 44 further including the step of encapsulating the scrim means and the intermediate fibrous material bonded to the scrim means by drawing them through a bath of polymeric material.

46. The method of claim 44 wherein further inhibiting bacterial growth on the belting by incorporating an effective antimicrobial amount of an antimicrobial compound into either or both the textile yarns and the bonding material.

47. The method of claim 44 further including the step of laminating an outer layer of fibrous material formed of discrete staple fibers consolidated through entanglement of the individual fibers to the exposed outer surface of at least one of the outermost scrim means by applying the bonding material between the scrim means and the outer fibrous material.

48. The method of claim 47 further including the step of encapsulating the laminate comprising the intermediate scrim means bonded between the at least two scrim means and the outer layer of fibrous material laminated to the exposed outer layer of at least one of the outermost scrim means wherein the laminate is encapsulated by drawing the laminate through a bath of polymeric material.

49. A conveyor belting, which comprises:

a) at least two generally planar and parallel scrim means, each comprising a plurality of substantially parallel textile yarns;

b) fibrous material provided to connect the two scrim means, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation;

c) a polymeric material encapsulating the adjacent scrim means and the connecting fibrous material; and d) an outer layer of fibrous material formed of discrete staple fibers consolidated with the exposed outer surface of at least one of the outermost scrim means through entanglement of the individual fibers comprising the outer layer and through needling entanglement with the yarns comprising the scrim means, and wherein the adjacent scrim means, the connecting fibrous material and the outer layer of fibrous material are encapsulated in the synthetic polymeric material.

50. The belting of claim 49 wherein the outer layer of fibrous material is formed by needling a non-woven web of staple fibers to each of the exposed outer surfaces of the outermost scrim means.

51. A conveyor belting, which comprises:

a) at least two generally planar and parallel scrim means, each comprising a plurality of substantially parallel textile yarns;

b) fibrous material provided to connect the two scrim means, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation; and c) a polymeric material encapsulating the adjacent scrim means and the connecting fibrous material, and wherein either or both the textile yarns and the polymeric material contain an effective antimicrobial amount of an antimicrobial compound to inhibit bacterial growth on the belting.

52. A conveyor belting, which comprises:

a) at least two generally planar and parallel scrim means, each comprising a plurality of substantially parallel textile yarns;

b) fibrous material provided to connect the two scrim means, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation;

c) a polymeric material encapsulating the adjacent scrim means and the connecting fibrous material; and d) fastener means at the opposed ends of the longitudinal extent of the belting to form an endless belting wherein the fastener means comprise hook-type fasteners having spaced apart legs extending from a loop portion of the fastener and wherein at least two fasteners are attached to each end of the belting with the spaced apart legs of each fastener secured to one of the two scrim means comprising the belting, and wherein the fasteners provided at each end are joined by a pivot rod means captured between the loop portion of the fasteners provided at each end of the belting.

53. A conveyor belting, which comprises:

a) at least two generally planar and parallel scrim means, each comprising a plurality of substantially parallel textile yarns;

b) a layer of fibrous material provided intermediate the two scrim means, the fibrous material being in the form of discrete staple fibers consolidated through entanglement of the individual fibers; and c) a bonding material provided between each of the scrim means and the intermediate fibrous material to thereby laminate the scrim means to the fibrous material, and wherein either or both the textile yarns and the bonding material contain an effective antimicrobial amount of an antimicrobial compound to inhibit bacterial growth on the belting.

54. A conveyor belting, which comprises:

a) at least two generally planar and parallel scrim means, each comprising a plurality of substantially parallel textile yarns;

b) a layer of fibrous material provided intermediate the two scrim means, the fibrous material being in the form of discrete staple fibers consolidated through entanglement of the individual fibers;

c) a bonding material provided between each of the scrim means and the intermediate fibrous material to thereby laminate the scrim means to the fibrous material; and d) an outer layer of fibrous material formed of discrete staple fibers consolidated through entanglement of the individual fibers and laminated to the exposed outer surface of at least one of the outermost scrim means by the bonding material provided between the scrim means and the outer fibrous layer.

55. The conveyor belting of claim 54 wherein a polymeric material encapsulates the laminate comprising the intermediate scrim means bonded between the at least two scrim means and the outer layer of fibrous material laminated to the exposed outer surface of at least one of the outermost scrim means.

56. A method for manufacturing a conveyor belting, which comprises:

a) providing at least two generally planar and parallel scrim means, each comprising a plurality of substantially parallel textile yarns;

b) connecting the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;

c) encapsulating the scrim means and the connecting fibrous material by drawing them through a bath of polymeric material; and d) needling an outer layer of fibrous material formed of discrete staple fibers to the exposed outer surface of at least one of the outermost scrim means through entanglement of the individual fibers comprising the outer layer and through needling entanglement of the fibrous material with the yarns comprising the scrim means.

57. The method of claim 56 including needling the outer layer of fibrous material to each of the exposed outer surfaces of the outermost scrim means.

58. A method for manufacturing a conveyor belting, which comprises:

a) providing at least two generally planar and parallel scrim means, each comprising a plurality of substantially parallel textile yarns;

b) connecting the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;

c) encapsulating the scrim means and the connecting fibrous material by drawing them through a bath of polymeric material; and d) inhibiting bacterial growth on the belting by incorporating an effective antimicrobial amount of an antimicrobial compound into either or both the textile yarns and the polymeric material.

59. A method for manufacturing a conveyor belting, which comprises:

a) providing at least two generally planar and parallel scrim means, each comprising a plurality of substantially parallel textile yarns;

b) connecting the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;

c) encapsulating the scrim means and the connecting fibrous material by drawing them through a bath of polymeric material; and d) connecting opposed ends along the longitudinal axis of the belting using fastener means to form an endless belting, wherein the fastener means comprise hook-type fasteners having spaced apart legs extending from a loop portion of the fastener and wherein connecting the opposed ends of the belting includes attaching at least two fasteners to each end of the belting by securing the spaced apart legs of each fastener to one of the two scrim means comprising the belting and then joining the fasteners provided at each end by a pivot rod means captured between the loop portion of the fasteners provided at each end.

* * * * *